United States Patent
Kozhuev

(10) Patent No.: US 7,416,363 B2
(45) Date of Patent: Aug. 26, 2008

(54) JOINT FOR FLAT PARTS

(76) Inventor: Vitaly Ivanovich Kozhuev, ul. Bronnitskaya, d.20, kv. 22, Saint-Petersburg (RU) 198013

( * ) Notice: Subject to any disclaimer, the term of this patent is extended or adjusted under 35 U.S.C. 154(b) by 102 days.

(21) Appl. No.: 10/585,776

(22) PCT Filed: Nov. 26, 2004

(86) PCT No.: PCT/RU2004/000479

§ 371 (c)(1),
(2), (4) Date: Jul. 11, 2006

(87) PCT Pub. No.: WO2005/068852

PCT Pub. Date: Jul. 28, 2005

(65) Prior Publication Data

US 2008/0025790 A1    Jan. 31, 2008

(30) Foreign Application Priority Data

Jan. 13, 2004    (RU) .............................. 2004101383

(51) Int. Cl.
*E04B 1/00* (2006.01)
(52) U.S. Cl. ................... 403/364; 403/339; 403/340; 403/353; 403/381; 52/590.2; 52/592.1
(58) Field of Classification Search .............. 403/353, 403/364, 381, 339, 340; 52/590.2, 592.1, 52/592.2; 24/405, 409
See application file for complete search history.

(56) References Cited

U.S. PATENT DOCUMENTS

| | | | | |
|---|---|---|---|---|
| 757,812 A | * | 4/1904 | Keyes | 403/364 |
| 4,541,525 A | * | 9/1985 | Braun et al. | 198/735.2 |
| 5,682,935 A | * | 11/1997 | Bustamante | 144/144.51 |
| 5,765,707 A | * | 6/1998 | Kenevan | 220/4.28 |
| 5,940,935 A | * | 8/1999 | Julius | 403/364 |

FOREIGN PATENT DOCUMENTS

| | | | |
|---|---|---|---|
| FR | 2 815 678 | * | 4/2007 |
| GB | 2 221 273 | * | 1/1990 |
| SU | 1624218 | * | 8/1988 |

OTHER PUBLICATIONS

Translation of FR 2 815 678. European Patent Office online translation.*

* cited by examiner

*Primary Examiner*—Michael P Ferguson
(74) *Attorney, Agent, or Firm*—John D. Gugliotta

(57) ABSTRACT

A joint for flat rigid parts comprises projections, which are embodied on the mating sides of the parts in the form of bulbous breadths at the edge thereof and necks at the basis thereof, and complementary joggles, which are embodied in the form of bulbous slots corresponding to the bulbous breadths of the projections and gradually changing into grooves corresponding to the projections necks. The surfaces of the projections edges and the surfaces of the slots bottoms mating therewith are embodied in the form of cones, wherein the peaks of the conical surfaces of the projections edges and of the slats bottoms are arranged an the opposite sides with respect to the connecting parts. The radius of curvature of the guiding lines of the conical surfaces of the projections edges and of the slots bottoms can be embodied in such a way that they tend to infinity; at least one connecting part can be embodied in the form of a through-thickness composite part.

7 Claims, 5 Drawing Sheets

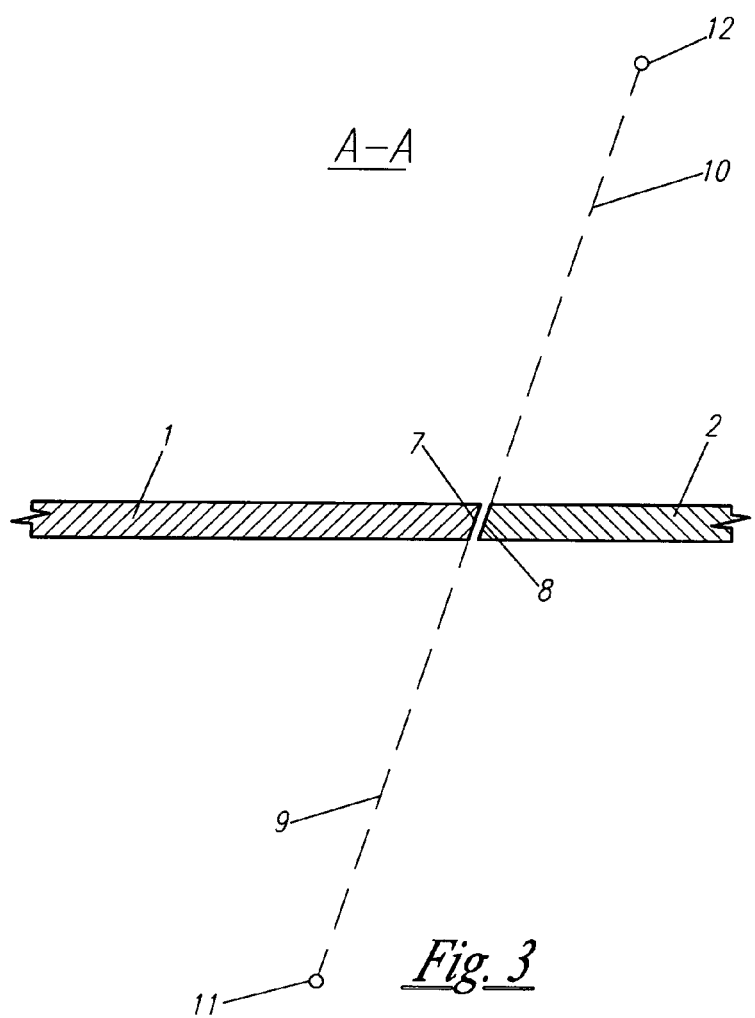
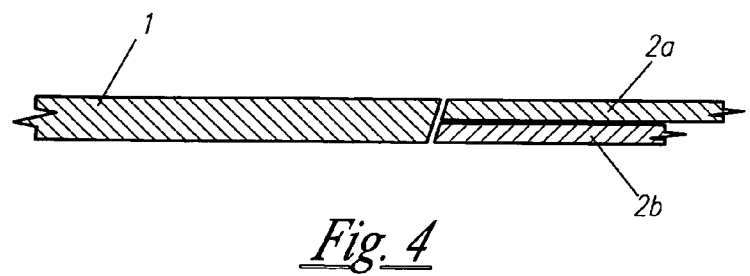

B-B

JOINT FOR FLAT PARTS

BACKGROUND OF THE INVENTION.

The invention relates to detachable joints for flat parts and can be used, in particular, for joining elements of building constructions, etc.

BACKGROUND ART

A joint of "tongue-and-groove" type is known in the art, RU, C1, 2063158. The construction is intended for joining the end surfaces of planks, which have longitudinal sides mated therebetween, with a transversal lath, wherein the joint between the planks and the joint between the planks and the lath are formed by complementary joggles and projections with shoulders, which are embodied in the form of a dovetail, and the shoulders are slanted from the surface perpendicular to the base plane of the planks towards the edges of the projection and the joggle.

The disadvantages of said engineering solution are in that such joint allows joining only narrow planks with a lath; the joining of wide plates is practically impossible, because it is very difficult to prevent the cramping of plates when overlapping them; also the joint is weak in bending because of the stress concentration that is produced in the bending points.

A joint for flat parts known in the art comprises mutually bonding complementary projections and sockets, embodied on the end surfaces of butt jointed parts and having the form of a dovetail, SU, A1, 1624218; longitudinal slits are embodied at the basis of each projection of one of the connecting parts; the mating side surfaces of the projections and the sockets are embodied with alternating combination of the slope directions, wherein the facing side surfaces of two adjacent projections have the same direction of slope, end surfaces of the projections of one part have alternating direction of slopes and the end surfaces of the projections of the mating part are rounded.

The joint can be used for connecting only elements having among them at least one element (part 1) made from an elastic and sufficiently flexible material such as rubber or soft plastics; this is required because during the assembly process the projections of part 1 have to be unbent and set into a position at a considerable angle to the part's surface; therefore, if both connecting parts are made from a rigid material, the joint thereof will be impossible, because in this joint the projections 4 have to move apart the projections 5; if the projections 3 are made from a rigid material, they will not unbend; if the projections 3 are made from a flexible but not elastic material, they will not return to the required position. Therefore, said assembly does not provide sufficient mechanical strength of the joint, because it is fundamentally unsuitable for the joining of rigid parts.

A joint for flat rigid parts known in the art comprises projections, which are embodied on the mating sides of the parts in the form of bulbous breadths at the edge thereof and necks at the basis thereof, and complementary joggles, which are embodied in the form of bulbous slots gradually changing into grooves corresponding to the projections necks; the surfaces of the projections edges and the surfaces of the joggles bottoms mating therewith are embodied in the form of cylinders, US, C, 5588240.

The joint allow joining parts of all degrees of rigidness, including absolutely rigid parts, in particular, made from tough metals, minerals and similar materials.

This engineering solution is taken as a prototype of the present invention.

The engineering solution provides a reliable joining of parts when the joint works in tension. However, the solution is unsuitable when the joint works in bending or in shear in the direction which is perpendicular to the surface of the connecting parts. Therefore, in practice the joint is applied only in various games.

BRIEF SUMMARY OF THE INVENTION.

It is an object of this invention to provide a solution for developing a joint for flat rigid parts, which works in tension, in bending and in shear.

According to the invention there is provided a joint for flat rigid parts, comprising projections, which are embodied on the mating sides of the parts in the form of bulbous breadths at the edge thereof and necks at the basis thereof, and complementary joggles, which are embodied in the form of bulbous slots corresponding to the bulbous breadths of the projections and gradually changing into grooves corresponding to the projections necks, and wherein the surfaces of the projections edges and of the slots bottoms mating therewith are embodied in the form of cones, and the peaks of the conical surfaces of the projections edges and of the slots bottoms are arranged on the opposite sides with respect to the connecting parts. The radius of curvature of the guiding lines of the conical surfaces of the projections edges and of the slots bottoms can be embodied in such a way that they tend to infinity; at least one connecting part can be embodied in the form of a through-thickness composite part.

The applicant hasn't found any source of information containing data on engineering solutions identical to the present invention. In applicant's opinion, this enables to conclude that the invention conforms to the criterion "Novelty" (N).

The novel features of the present invention provide an important technical effect produced by the inventive joint. The connecting flat parts effectively work not only in tension but also in bending (in one direction) and in shear in the direction which is perpendicular to the surface of the connecting parts. This enables the industrial application of the invention for reliable joining of elements of various constructions, including building constructions.

The applicant hasn't found any source of information containing data on the influence of the inventive novel features on the technical result produced through the realization of said features. In applicant's opinion, this enables to conclude that the present engineering solution conforms to the criterion "Inventive Step" (IS).

BRIEF DESCRIPTION OF THE DRAWINGS

The invention is further illustrated, by way of example, with reference to the accompanying drawings in which:

FIG. 3 is a section of FIG. 1 on the A-A line;

FIG. 4 is a cross-sectional view of the invention, where one of the connecting details is embodied in the form of a through-thickness composite part;

Figure 1:
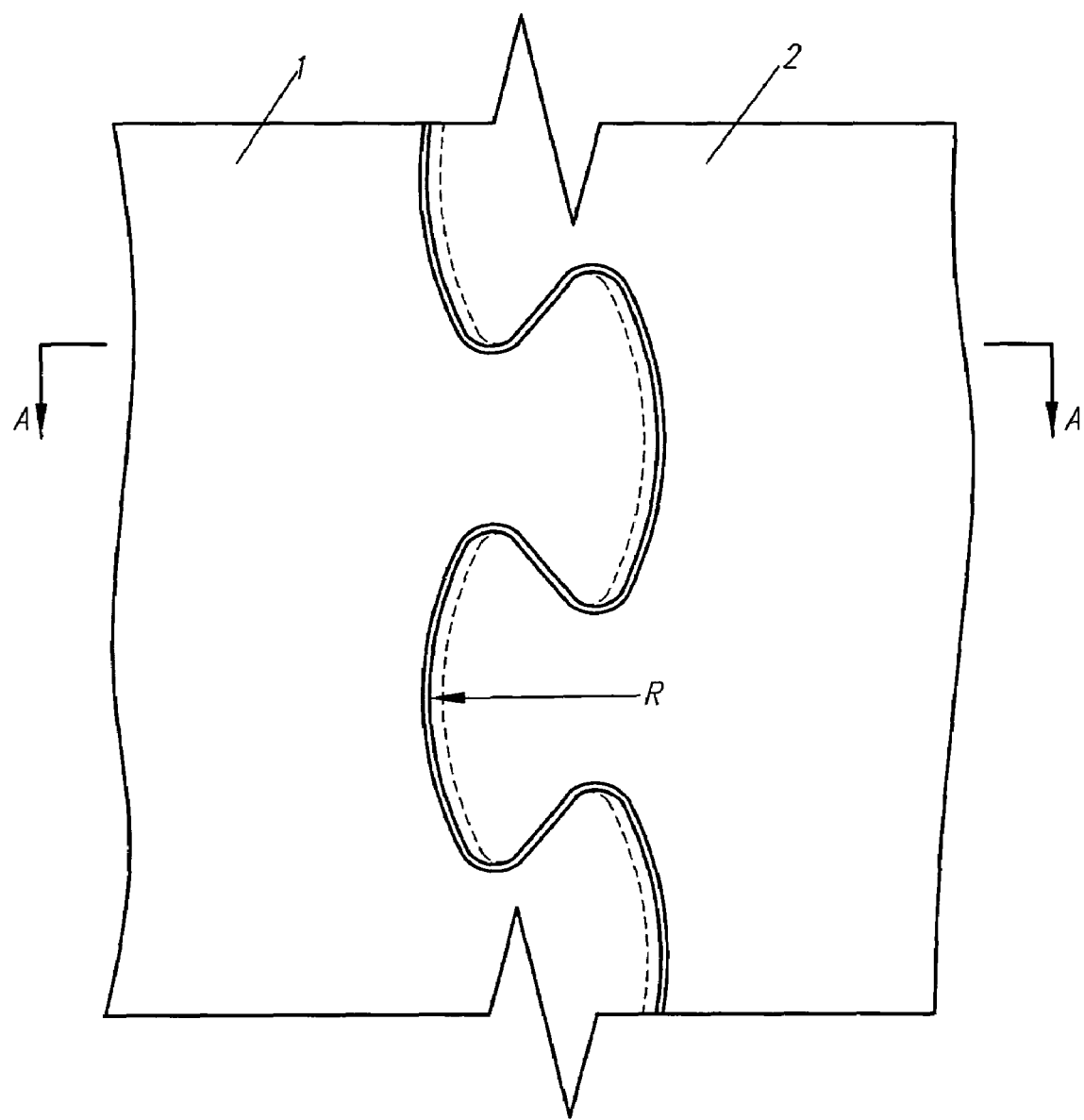
FIG. 1 is a plan view of the invention as claimed in claim 1.
Figure 2:
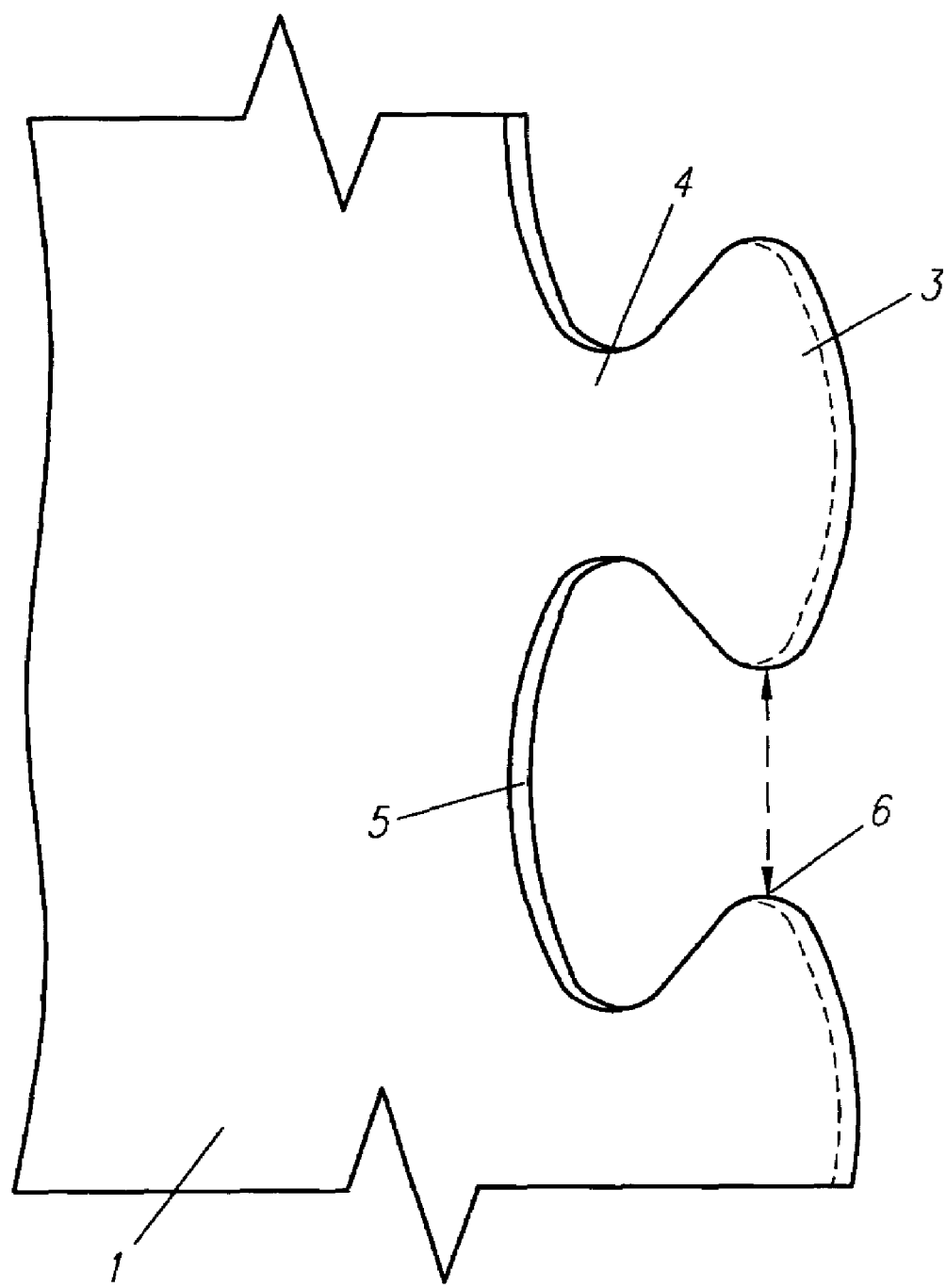
FIG. 2 is a view of the part 1.

DETAILED DESCRIPTION OF THE INVENTION.

The joint for flat parts 1 and 2 comprises projections, which are embodied on the mating sides of the parts in the form of bulbous breadths 3 at the edge thereof and necks 4 at the basis thereof, and complementary joggles, which are embodied in the form of bulbous slots 5 corresponding to the bulbous breadths 3 of the projections and gradually changing into grooves 6 corresponding to the projections necks 4. The surfaces 7 of the projections edges and the surfaces 8 of the slots bottoms mating therewith are embodied in the form of cones. The guiding line 9 of the conical surface 7 passes through the peak 11, and the guiding line 10 of the conical surface 8 passes through the peak 12; the peaks 11 and 12 are arranged on the opposite sides with respect to the connecting parts.

Figure 5:
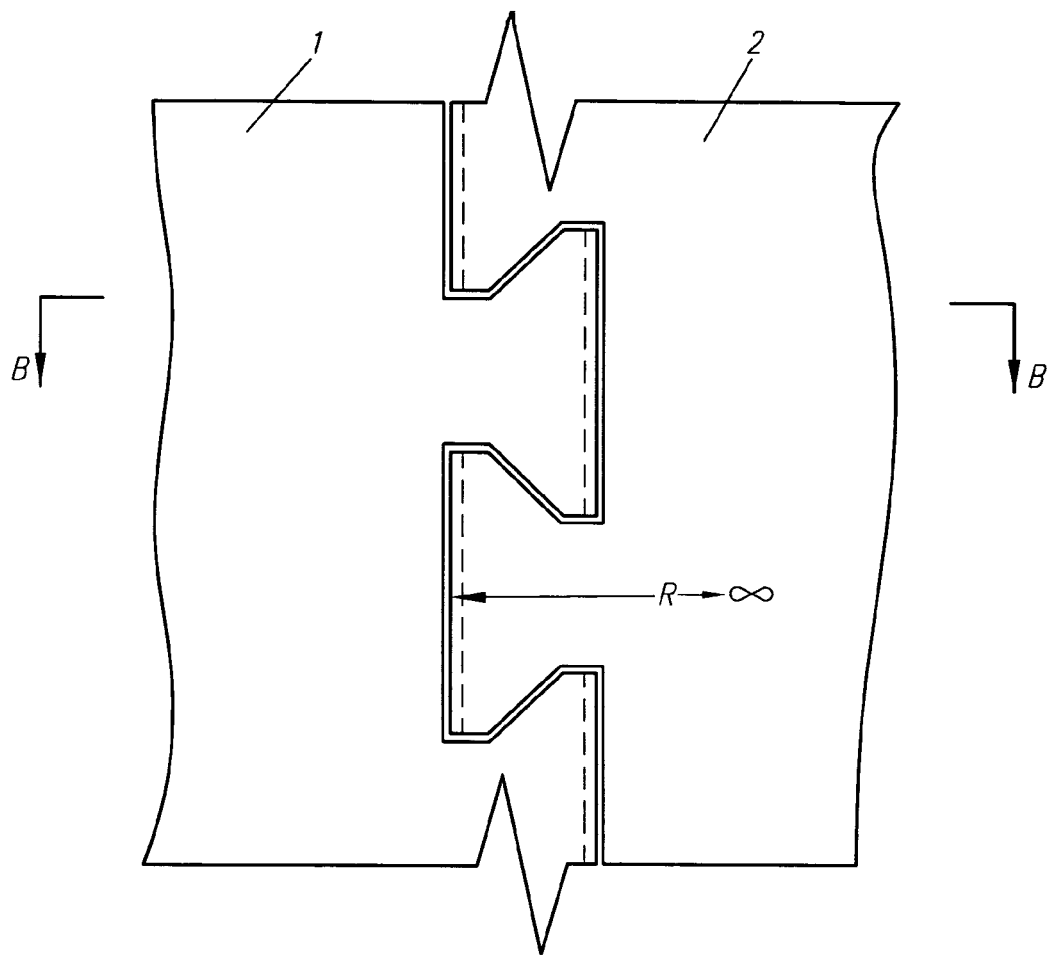
FIG. 5 is a view of the invention, where the radiuses of curvature of the conical surfaces tend to infinity.
Figure 6:
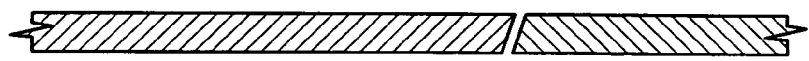
FIG. 6 is a section of FIG. 5 on the B-B line.

Generally the radius of curvature R of the guiding lines of the conical surfaces 7 and 8 (the radius of curvature of the projection is equal to the radius of curvature of the slot within the accuracy of the value of the gap between the connecting parts 1 and 2) have limited values. In this case the guiding lines of the conical surfaces 7 and 8 have the shape of curved lines (see FIG. 1). However, if R tends to infinity, the shape of the guiding line of the conical surface tends to a straight line (see FIG. 5).

At least one connecting part can be embodied in the form of a through-thickness composite part (see FIG. 4). In this case the part 2 consists of two pieces: upper piece 2a and lower piece 2b.

Figure 7:
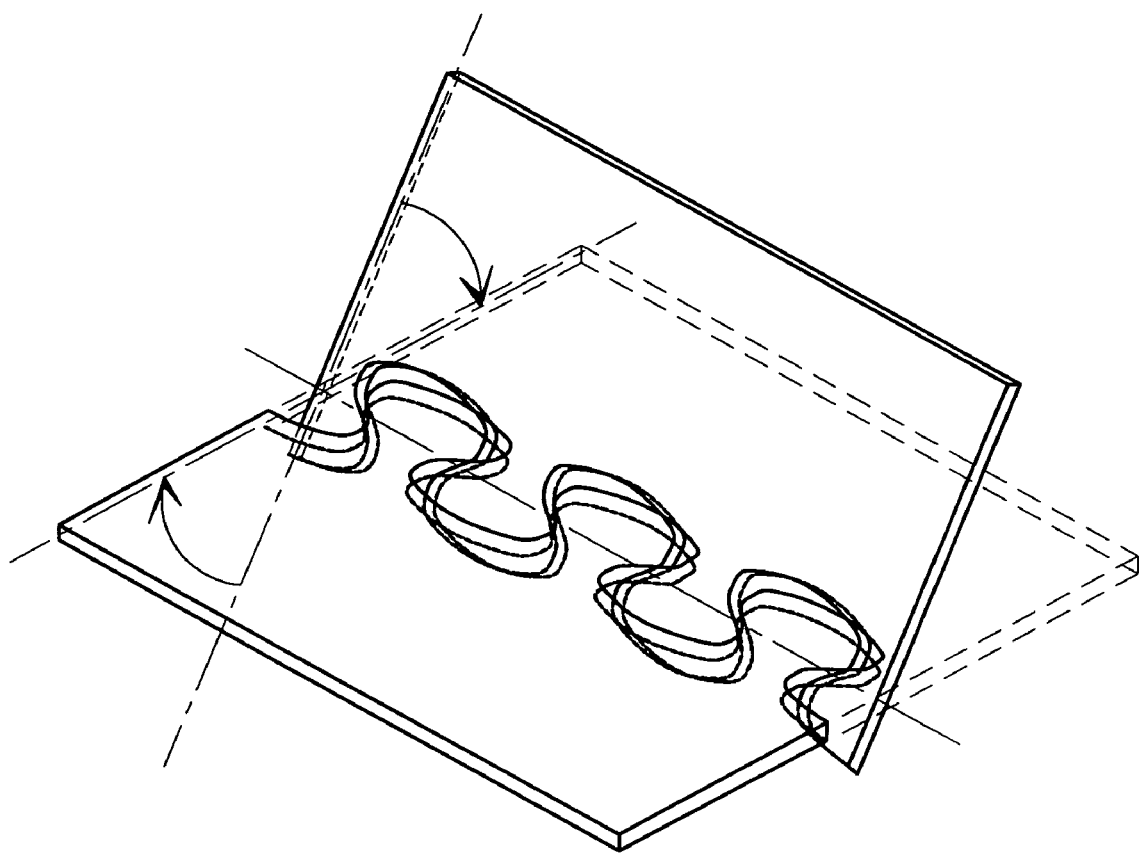
FIG. 7 is a scheme illustrating the process of parts joining.

Parts 1 and 2 are joined in the following way. At first the parts are overlapped in such a way that their surfaces are positioned at an angle that is close to a right angle (see FIG. 7), and the bulbous breadths 3 of the part 2 enter the bulbous slots 5 of the part 1; then the parts 1 and 2 are turned relative to each other, whereupon the breadths 3 are placed into the slots 5. Accordingly, the necks 4 of the projections of each part are placed into the grooves 6 of another part. The mutual rotation of the parts 1 and 2 is stopped when the conical surfaces 7 of the breadths 3 meet the conical surfaces 8 of the slots 5, wherein both parts will be located in the same plane. Thus, a uniform rigid plate is formed capable of working in tension-compression and in shear, virtually in the same way as a whole plate; the assembled construction works in bending in only one direction, namely when the bending moment has the same direction as the rotation of the plates during the assembly process. The disassembling of the construction is performed in reverse order.

INDUSTRIAL APPLICABILITY

Known simple industrial equipment and constructive materials common in the art are used for the production of the inventive device, which enables to conclude that the inventive device conforms to the criterion "Industrial Applicability" (IA).

The invention claimed is:

1. A joint joining flat rigid parts, the joint comprising projections, which are embodied on mating sides of the parts in the form of bulbous breadths at an edge thereof, and necks at the base thereof and complementary joggles, which are embodied in the form of bulbous slots located between and corresponding to the bulbous breadths of the projections and gradually change into grooves corresponding to the projection necks, characterized in that the surfaces of edges of the projections and surfaces of the bottoms of the slots of each part are embodied in the form of adjacent conical surfaces, wherein the peaks of the conical surfaces of the projection edges and of the slots of each part arranged on opposite sides with respect to a plane of each respective part, wherein a lower and upper part are joined by overlapping said upper part and said lower part in such a way that the respective planes of said upper and lower part are positioned at an angle that is close to a right angle, aligning bulbous breadths of the lower the with the bulbous slots of the upper part, placing the projection necks of the upper part placing the necks of the upper piece into the mating grooves of the lower part, respectively, and rotating said upper part relative to said lower part until conical surfaces of the breadths of the lower part meet the conical surfaces of the slots, of the upper part wherein both parts are located in the same plane.

2. A joint as claimed in claim 1, characterized in that a radius of curvature of the conical surfaces of the projection edges and of the slot bottoms are is embodied in such a way that it approaches infinity.

3. A joint for joining flat parts having a first mating side and a second mating side said joint comprising:
a first series of projections formed on said first mating side and each projection having a first sides and having a bulbous breadth at the edge thereof and a neck at a base thereof;
a second series of projections formed on said second mating side and each projection having a second bulbous breadth at the edge there of and a neck at a base thereof;
complementary joggles which are embodied in the form of bulbous slots located between and corresponding to said first bulbous breadths and said second bulbous breadths respectively, such that said joggles gradually change into grooves corresponding to the projection necks, wherein the surfaces of the edges of the projections and the surfaces of the bottoms of the slots of each part each comprise conical surfaces having a peak, and wherein said peaks of the projection edges and the slots are arranged on opposite sides with respect to a plane of each part, wherein a lower and upper part are joined by overlapping said upper part and said lower part in such a way that the respective planes of said upper and lower part are positioned at an angle that is close to a right angle, aligning bulbous breadths of the lower part with the bulbous slots of the upper part, placing the necks of the upper part into the mating grooves of the lower part, respectively, and rotating said upper part relative to said lower part until conical surfaces of the breadths of the lower part meet the conical surfaces of the slots of the upper part, wherein both parts are located in the same plane.

4. The joint for flat pans of claim 3, wherein a radius of curvature R of the conical surfaces is equal to the radius of curvature of the slot within the accuracy of the value of the gap between the parts.

5. The joint of claims 1 or 4, wherein a uniform rigid plate is formed by the joined parts capable of working in tension-compression and in shear, virtually in the same way as a one piece plate.

6. The joint of claim 5, wherein an assembled construction of parts bends in only one direction, namely when the bending moment urges together the conical surfaces of the breadths to meet the conical surfaces of the slots.

7. The joint of claim 6, wherein disassembling of the construction of parts is performed by applying a bending moment that drives apart the conical surfaces of the breadths away from the conical surfaces of the slots.

* * * * *